United States Patent
Roa et al.

(10) Patent No.: US 11,553,725 B2
(45) Date of Patent: Jan. 17, 2023

(54) FOODSTUFFS COMPRISING TREATED FAVA BEAN PROTEIN CONCENTRATES

(71) Applicant: Corn Products Development, Inc., Westchester, IL (US)

(72) Inventors: Brandon Roa, Bridgewater, NJ (US); Erhan Yildiz, Bridgewater, NJ (US); Nagul Naguleswaran, Bridgewater, NJ (US); Dilek Uzunalioglu, Bridgewater, NJ (US); Canan Ozer, Bridgewater, NJ (US); Bicheng Wu, Bridgewater, NJ (US); Xin Yang, Bridgewater, NJ (US); Caterina Loduca, Bridgewater, NJ (US)

(73) Assignee: Corn Products Development, Inc., Westchester, IL (US)

( * ) Notice: Subject to any disclaimer, the term of this patent is extended or adjusted under 35 U.S.C. 154(b) by 433 days.

(21) Appl. No.: 16/498,655

(22) PCT Filed: Mar. 29, 2018

(86) PCT No.: PCT/US2018/025225
§ 371 (c)(1),
(2) Date: Sep. 27, 2019

(87) PCT Pub. No.: WO2018/183729
PCT Pub. Date: Oct. 4, 2018

(65) Prior Publication Data
US 2020/0045994 A1 Feb. 13, 2020

Related U.S. Application Data

(60) Provisional application No. 62/523,851, filed on Jun. 23, 2017, provisional application No. 62/479,523, filed on Mar. 31, 2017.

(51) Int. Cl.
| | | |
|---|---|---|
| A23J 1/14 | (2006.01) | |
| A23L 11/00 | (2021.01) | |
| A23G 1/44 | (2006.01) | |
| A23G 3/44 | (2006.01) | |
| A23G 9/38 | (2006.01) | |

(52) U.S. Cl.
CPC ............ *A23J 1/14* (2013.01); *A23G 1/44* (2013.01); *A23G 3/44* (2013.01); *A23G 9/38* (2013.01); *A23L 11/05* (2016.08)

(58) Field of Classification Search
CPC ... A23J 1/14; A23L 11/05; A23G 1/44; A23G 3/44; A23G 9/38
See application file for complete search history.

(56) References Cited

U.S. PATENT DOCUMENTS 4,483,874 A   11/1984   Olsen

FOREIGN PATENT DOCUMENTS

| JP | S609447 A | 1/1985 |
| WO | WO2014/174149 A1 | 10/2014 |
| WO | 2016120234 A1 | 8/2016 |

OTHER PUBLICATIONS

Salazar et al. Protein structural changes during processing of vegetable feed ingredients used in swine diets: implications for nutritional value, Nutrition Research Reviews (2016), 29, 126-141 (Year: 2016).*
https://www.convertunits.com/from/gram+calorie/to/Joules (Year: 2022).*
M.Youssef, "Breadmaking Properties of Composite Flours of Wheat and Faba Bean Protein Preparations", Cereal Chemistry, vol. 63, No. 4; Jan. 1, 1986, pp. 357-361.
Jiang Zhong-Qing "Faba Bean Flavour and technological Property Improvement by Thermal Pre-Treatments", LWT—Food Science and Technology, Academic Press, UK, vol. 68, Dec. 12, 2015, pp. 295-305.
K.D. Schwenke, "Functional Properties of Plant Proteins. Part 2. Selected Physiocochemical Properties of of Native and Denatured Protein Isolates From Faba Beans, Soybeans, and Sunflower Seed" Nahrung—Food, vol. 25, No. 1, Jan. 1, 1981, pp. 56-69.
International Search Report, PCT/US2018/025225, Filed Mar. 29, 2018.
Roschupkina I. Yu, et al., Emulsions. Methodical Instructions, Samara State Aerospace University named after Academician S. P. Korolev, Samara, 2011, p. 5.

\* cited by examiner

*Primary Examiner* — Jyoti Chawla
(74) *Attorney, Agent, or Firm* — Jason Grauch

(57) ABSTRACT

This specification discloses heat moisture treated fava bean protein concentrates having between about 50% and about 73% protein, about 0.1% to about 8% be weight starch, and between about 0.1% and about 9% fat, and use of said concentrates in foodstuffs, including for example emulsions, confectionary spreads, and ice cream.

13 Claims, 2 Drawing Sheets

FOODSTUFFS COMPRISING TREATED FAVA BEAN PROTEIN CONCENTRATES

CROSS-REFERENCE TO RELATED APPLICATION

This application is a U.S. National Phase application which claims priority to PCT/US2018/025225, which claims priority to U.S. Provisional Application Ser. No. 62/479,523, and to U.S. Provisional Application Ser. No. 62/523,851 which are incorporated by reference herein in their entirety.

This application discloses a heat moisture treated fava bean protein concentrate and its use in foodstuffs including as an emulsifier.

Fava beans are relatively high protein and low fat food source making them an attractive substitute for proteins from animals and nuts. In an aspect, this specification discloses use of heat moisture treated fava bean protein concentrates in foodstuffs and said foodstuffs. In another aspect, this specification discloses use of heat moisture treated fava protein concentrates as an emulsifier in foodstuffs and said foodstuffs, and foodstuffs comprising emulsions. In still another aspect this specification discloses use of heat moisture treated fava bean protein concentrates in a confectionary spread or an ice cream, and said spread or said ice cream. In another aspect a heat moisture treated fava bean protein concentrate is modified using heat and controlled moisture. In still other aspects, this specification discloses a heat moisture treatment that denatures at least some of the proteins in a heat moisture treated fava bean protein concentrate as measured by a change in denaturation enthalpy and/or amount of aggregated particles. In still another aspect, heat moisture treated fava bean protein concentrates were found to work better as emulsifiers than pulse protein isolates, heat moisture treated pulse flour and heat moisture treated non-fava bean pulse protein concentrates, and untreated fava bean protein concentrates.

In some embodiments foodstuffs comprise a heat moisture treated fava bean protein having between about 0.1% to about 8% starch (w/w), between about 50% to about 73% protein (w/w), and between about 0.1% and 9% fat (w/w). In other embodiments a foodstuff comprises a heat moisture treated fava bean protein concentrate made by a process that denatures at least some of the protein in the fava bean protein concentrate such that aggregate particles form. In still other embodiments a heat moisture treatment process denatures at least some of the proteins in a heat moisture treated fava bean protein concentrate such that said concentrated has a lower denaturation enthalpy than an untreated fava bean protein concentrates. In yet other embodiments a foodstuff comprises a heat moisture treated fava bean protein concentrate having a denaturation enthalpy that is between 10% and 30% lower than a denaturation enthalpy of an untreated fava bean protein concentrate. In yet still other embodiments a foodstuff comprises a heat moisture treated fava bean protein concentrate having a denaturation enthalpy of a between about 5.5 and 7.0 J/g or between about 6 and about 6.5 J/g.

In various embodiments a foodstuff comprising a heat moisture treated fava bean protein concentrate uses said concentrate as emulsifier. In other aspects a foodstuff comprising a heat moisture treated fava bean protein concentrate is an emulsion or comprises an emulsion. In various embodiments foodstuffs comprising an emulsion using a heat moisture treated fava bean protein concentrate comprises a continuous phase being between about 15% and about 95% by weight of the emulsion, or between about 25% and 75%. In other embodiments an emulsion comprises a disperse phase being about 1% and about 75% by weight the emulsion or between 1% and 50%, or between 10% and 40%. In embodiments an emulsion comprises an emulsifier being between about 0.1% and about 25% by weight of the emulsion. In embodiments a foodstuff being or comprising an emulsion has an acidic pH, or a pH between about 3 and 6, or between 4 and 5, because of acidulants in the foodstuff, or the emulsion, or the continuous phase of the emulsion. In embodiments a foodstuff comprising or being emulsion said emulsion comprises at least 50% heat moisture treated fava bean protein concentrate, wherein said concentrate is used as an emulsifier. In embodiments a foodstuff comprising or being an emulsion contains only plant based emulsifiers, or only a heat moisture treated fava bean protein concentrate emulsifier. In another embodiment said foodstuff using a heat moisture treated fava bean protein concentrate is a confectionary spread or an ice cream. In still another embodiment a confectionary spread comprises a heat moisture treated fava bean protein concentrate; a plant oil; and, optionally, a sweetener.

The foregoing description as well as the following more detailed description of emulsions comprising heat moisture treated fava bean protein concentrates and/or heat moisture treated fava bean protein concentrates are further described by the following drawings, which are illustrative. The full scope of the invention is not limited by any embodiments depicted within the drawings.

Figure 1A:
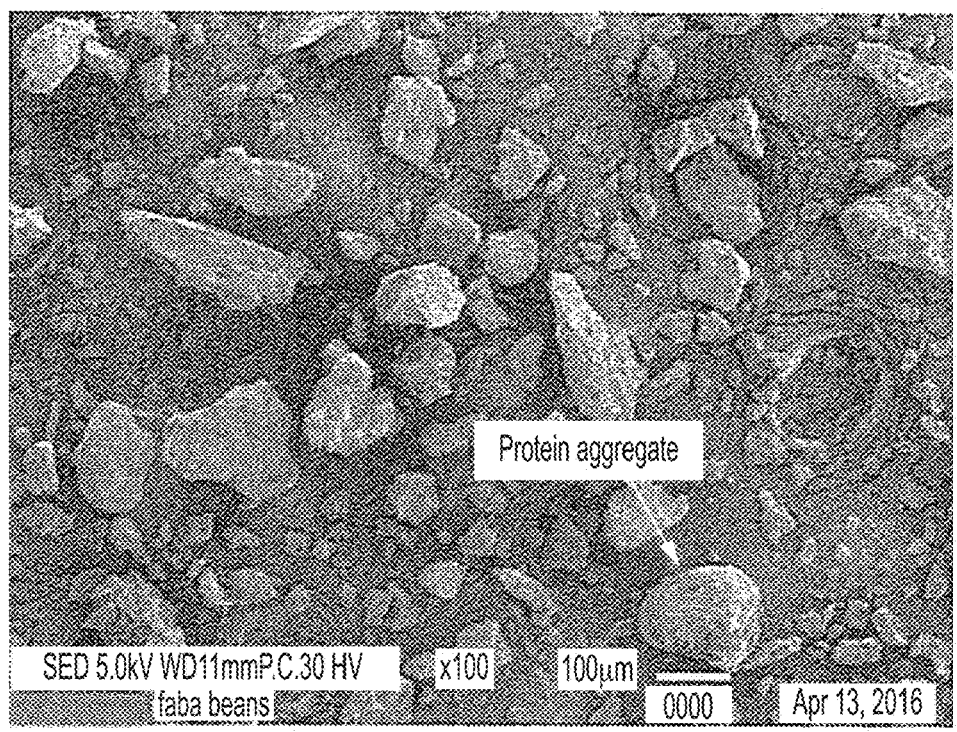
FIG. 1a is an SEM image of the aggregates within an illustrative heat moisture treated fava bean protein concentrate.

In one aspect this specification discloses foodstuffs comprising a heat moisture treated fava bean protein concentrate. In various embodiments said heat moisture treated fava bean protein concentrates have more protein and less starch than fava bean flours, but less protein and more starch than fava bean protein isolates. In some embodiments, heat moisture treated fava bean protein concentrates comprise, by weight, between about 50% and about 73% protein, or 55% and about 70% or between about 60% and about 70%. In other embodiments said heat moisture treated fava bean protein concentrates have up to 25% starch, but more typically between about 0.1% and about 10% starch or between 2% and about 8% or about or between 4% and about 8%. In still other embodiments heat moisture treated fava bean protein concentrates or between about 0.1% and 9% by weight fat, in embodiments between 0.1 and 5%.

As used in this specification a pulse flour (including fava bean flour) is a composition derived from the milling of a pulse (for example a fava bean), and contains all components of the pulse in weight ratios approximately as found in the unmilled pulse. Pulse flour, similar to other flours, comprises protein, fiber, starch, fat, ash. Pulse flour (including fava bean flour) typically comprises between about 10% and about 40% protein and between about 40% and about 60% starch by weight.

In various aspects, a pulse protein concentrate (including fava bean protein concentrate) differs from pulse protein isolates and pulse flours (both of which may be from fava bean) in the relative amounts of protein to other components in the flour or protein isolate. In embodiments, a heat moisture treated fava bean protein concentrate can be derived from fava bean flour using dry fractionating methods known in the art. In an illustrative method, the components of a fava bean flour can be separated out by for example weight and/or size.

In embodiments a heat moisture treated fava bean protein concentrate for use in the disclosed foodstuffs is made by a heat and moisture treated process that gelatinizes at least some of the starch in said concentrate. As used in this specification a gelatinized starch has been modified to break down the intermolecular structure of the starch granule, destroying the starch's crystallinity and causing the starch to lose its birefringence when examined with polarized light.

In embodiments a foodstuff comprising a heat moisture treated fava bean protein concentrate has some aggregated particles and some non-aggregated particles. In embodiments said concentrate has a particle distribution having a volume mean diameter or D[4,3] (calculated by the formula $\Sigma d^4/\Sigma d^3$, where d is the diameter of all measured particles in the sample). In embodiments said concentrate has a particle distribution having a surface mean diameter or D[3,2] (calculated by the formula $\Sigma d^3/\Sigma d^2$, where d is the diameter of all measured particles in the sample).

Within this specification, all percentages are by weight unless specified otherwise.

In one or more embodiments this specification discloses foodstuffs comprising heat moisture treated fava bean protein concentrates made by a process using a controlled amount of heat. In embodiments, said process applies controlled temperature and moisture to a fava bean protein concentrate, or controls the base moisture of a fava bean protein concentrate before heating. In one or more embodiments, said process comprises heating a fava bean protein concentrate to temperatures between 100 and 180° C. In one or more other embodiments, said process comprises heating a fava bean protein concentrate in steam, or by steeping in water. In some embodiments said process comprises, prior to or during heating, adjusting the moisture of a fava bean protein concentrate to between about 10% and about 50% (dsb). Such processes can be conducted using any equipment known in the art which provides sufficient capabilities for such treatment, particularly those which are enabled for powder processing, moisture addition and/or moisture control, mixing, heating and drying. Embodiments, of a heat treatment may be done as a batch or a continuous process. In one embodiment, the equipment is a batch ploughshare mixer. In another embodiment, the equipment is a continuous solid-liquid mixer followed by a continuous heated conveyer screw. In yet another embodiment, the continuous process uses a tubular thin film dryer by itself or in combination with a continuous screw to extend and control the residence time. Any system used may be pressurized to control the moisture content at target temperatures of or above 100° C.

Figure 1B:
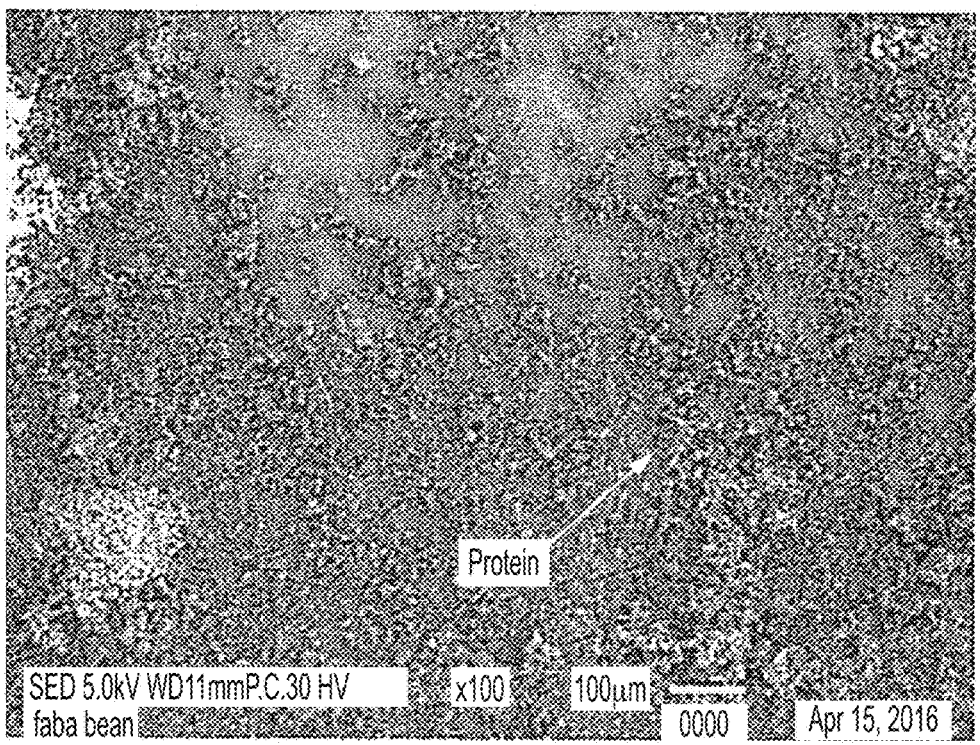
FIG. 1b is an SEM image of untreated fava bean protein concentrate.

In one or more embodiments, a foodstuff comprises a heat moisture treated fava bean protein concentrated having denatured proteins and gelatinized starch. In some embodiments said heat moisture treated fava bean protein concentrate contains aggregated particles which comprise denatured proteins and may also include starch, fiber and other components naturally within an untreated fava bean protein concentrate. Aggregates appear as larger particles than non-aggregated protein and starch. An embodiment of a heat moisture treated fava bean protein concentrate comprising aggregated particles is shown in FIG. 1a and, can be compared to an untreated fava bean protein concentrate, which is shown in FIG. 1b.

In embodiments, a foodstuff comprises a heat moisture treated fava bean protein concentrate having a volume mean diameter of the distribution of particles of greater than 20 microns, or between about 20 and about 100 microns, or between 30 and 90 microns. In yet other embodiments a volume mean diameter of a heat moisture treated fava bean protein concentrate is at least 3 times the volume mean diameter of particles of an unmodified heat moisture treated fava protein concentrate, or at least 5 times larger, or between 3 and 10 times larger, or between 4 and 8 times bigger. In other embodiments, a foodstuff comprises a heat moisture treated fava bean protein concentrate having a surface mean diameter of the distribution of particles that is greater than about 5 microns, or about 15 microns, or between about 5 and about 40 microns, or between 5 and 20 microns. In still other embodiments a surface mean diameter of a heat moisture treated fava bean protein concentrate is at least 1.5 times the surface are mean of the particles of an unmodified fava bean protein concentrate, or at least 2 times bigger, or between 1.5 and 5 times, or between about 2 times and 4 times bigger.

Figure 2A:
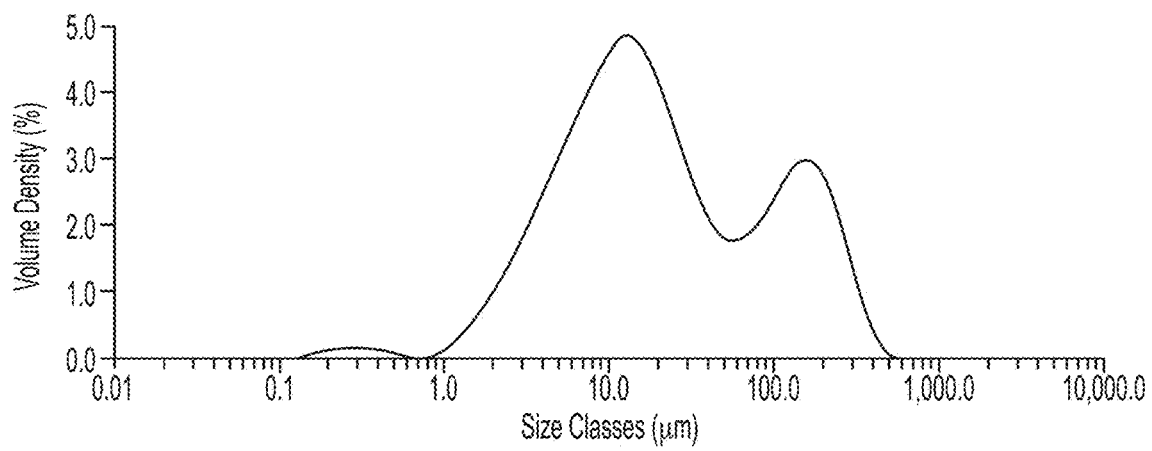
FIG. 2a is a graph illustrating the particle size distribution of a heat moisture treated fava bean protein concentrate.
Figure 2B:
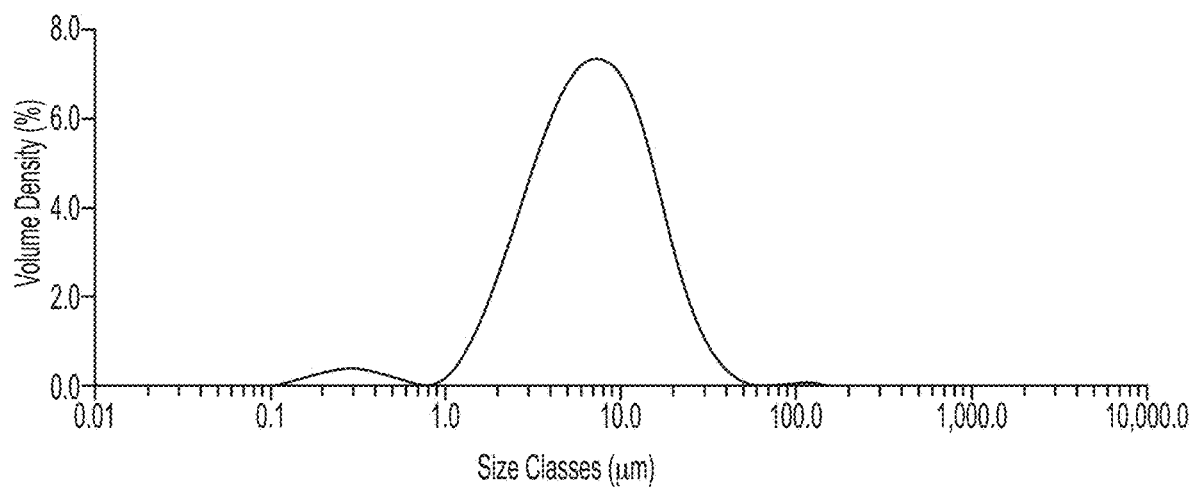
FIG. 2b is a graph illustrating the particle size distribution of an untreated fava bean protein concentrate.

With reference now to FIG. 2a, it is seen by the bimodal particle distribution that some of the components of an illustrative heat moisture treated fava bean protein concentrate are aggregated, and some are not suggesting that not all protein in the heat moisture treated fava bean protein concentrate are denatured. The relative amount of denatured protein in a heat moisture treated fava protein concentrate can be measured by differential scanning calorimetry by comparing an onset and/or a peak denaturation temperature and/or denaturation enthalpy of a heat moisture treated fava bean protein concentrate and an untreated fava bean protein concentrate. In one or more embodiments disclosed in this specification a foodstuff comprises a heat moisture treated fava bean protein concentrate having onset denaturation temperature ($T_o$) between about 1% and about 5% lower than an untreated fava protein concentrate; or between about 2% and about 4% lower, or between about 2% and about 3% lower. In some other embodiments a foodstuff comprises a heat moisture treated fava bean protein concentrated having a peak denaturation temperature ($T_d$) between about 1% and about 5% lower than an untreated fava protein concentrate; or between about 2% and about 4% less; or between about 2% and about 3% less. In yet other embodiments a foodstuff comprises a heat moisture treated fava bean protein concentrated having a denaturation enthalpy ($\Delta H$) between about 10% and about 30% lower than an untreated fava bean protein concentrate; or between about 15% and about 25% less, or about 20% less. In still other embodiments foodstuff comprises a heat moisture treated fava bean protein concentrate has a denaturation enthalpy of a heat moisture treated fava bean protein concentrate is between about 5.5 and 7.0 J/g, or between about 6 and about 6.5 J/g. In even other embodiments foodstuff comprises a heat moisture treated fava bean protein concentrate has a peak denaturation temperature between 85 and 88.5° C., or between 87 and 88° C. In one or more embodiments DSC measurements are made as follows: samples were prepared at about 5% (w/v) protein in water in a high volume stainless DSC pan. A reference pan was prepared with equal weight of water only. The sample and reference pans were heated at 2° C. per minute from 20 to 100° C. differential scanning calorimeter.

In another aspect this specification discloses foodstuffs using of a heat moisture treated fava bean protein as an emulsifier or using emulsions comprising a heat moisture treated fava bean protein concentrate.

In various embodiments a foodstuff a disclosed in this specification may comprise a heat moisture treated fava bean concentrate and at least one additional edible ingredient, which include but are not limited flour, starch, modified or not, and derived from any source including cereal grains (corn, rice, oats, sorghum, millet), roots (tapioca, potato), pulses (including flours, concentrates, and isolate, which may be from the same base pulse as used in the emulsion or a different base pulse) milk, whey protein, caseins, eggs, egg whites, fruit, gums or other hydrocolloids, sweeteners, stabilizers, meat, and other ingredients commonly used in the food industry.

In some embodiments, the second edible ingredient may be the primary ingredient and may be used in amounts of between 1 and 90% by weigh the foodstuff. Frequently, but not necessarily starches and flours, including pulse flours will make up not more than 50% by weight of the foodstuff, and are typically used in amounts ranging from 20% to 40% by weight of the foodstuff.

In one or more embodiments a foodstuff is an emulsion or comprises an emulsion. In some embodiments foodstuff uses a heat moisture treated fava bean protein concentrate as the primary emulsifier. In other embodiments of said foodstuff a heat moisture treated fava bean protein concentrate is more than 50% of all emulsifiers used or more than 75% or more than 90% of all emulsifiers used, or is the only emulsifier used in the emulsion. In other embodiments the said foodstuff uses no animal products as an emulsifier.

In various embodiments this specification discloses foodstuffs comprising emulsions that are oil-in-water emulsions. In some embodiments an emulsions comprises a heat moisture treated fava bean protein and a continuous phase which is between about 15% and about 95% by weight of the emulsion, or 15% and 90% or 25% and 75% or 30 and 60%, or about 50%. In embodiments a continuous phase is water or water based. In some embodiments a continuous phase may include aqueous liquids typical in emulsions including vinegar and fruit juice. In embodiments the pH of a continuous phase is acidic, or has pH below 6.5, or between about 3 and about 6, or between about 4 and about 5. In other embodiments an emulsion comprises a dispersed phase which is between about 1% and about 75% by weight the emulsion, or between about 1% and 50% or between about 10% and about 40%, or about 30%. In embodiments the disperse phase is an oil suitable for use in an emulsion including but not limited to vegetable oils, nut oils, seed oils, and fruit oils. In embodiments an emulsion comprises an emulsifier which is between about 0.1% and about 25% the emulsion, or about 0.1% and 5% or between about 0.5% and about 2.5%, or about 1% or about 0.75%. In embodiments, an emulsion may include other ingredients such as sugar, salt, seasonings, starch and preservatives commonly used in the food industry.

In embodiments, emulsions are made by standard methods: dry ingredients including a heat moisture treated fava bean protein concentrate are typically mixed prior to adding wet ingredients. Typically aqueous ingredients are added and mixed with the dry ingredients until the mixture is homogenized. Oil is added to the aqueous ingredients and mixed to form an emulsion. Emulsions typically form in between about 0.25 and about 3 minutes. In embodiments, all ingredients are mixed in standard commercial mixers or homogenizers.

In another aspect this specification discloses heat moisture treated fava bean protein concentrates that are better emulsifiers, and so improve emulsions compared to said emulsions using a heat moisture treated pulse flour, a non-fava bean heat moisture treated pulse concentrate, a untreated pulse flours and concentrate, and/or a pulse protein isolate. In embodiments disclosed in the specification emulsions using fava bean protein concentrates have higher viscosity and/or smaller disperse phase droplet size than said emulsion made using a heat moisture treated pulse flour, a non-fava bean heat moisture treated pulse concentrate, a untreated pulse flours and concentrate, and/or pulse protein isolate. In other embodiments emulsion made using the a heat moisture treated fava bean protein concentrate have a viscosity of between about 5% and 25% greater, or between about 10% and 20% greater or about 20% greater than emulsions made from the same amount a heat moisture treated pulse flour, a non-fava bean heat moisture treated pulse concentrate, a untreated pulse flour and concentrate, and/or pulse protein isolate. In various embodiments an emulsion has a viscosity of between 500 and 50,000 cP, between 5,000 and 25,000 cP, or between about 17,500 and about 22,500 cP, or between about 19,000 and about 22,500 cP, or about 22,500 cP. In another embodiment an emulsion having a pH of between about 3 and about 5 has a viscosity of between 19,000 and 22,500 cP with an oil load (soybean oil) of between 30% and 50% at between 20 to 25° C. In embodiments, emulsions using a heat moisture treated fava bean protein concentrate were process tolerant and experience little viscosity or emulsion break down (as measured by increase in droplet size) over time. In one or more embodiments emulsions maintained at least 90% of their viscosity after one month storage at pH of between 3 and 5. In some embodiments using heat moisture treated fava bean protein concentrates maintained at least 95% of their viscosity after one week's storage at room temperature (between 20 and 25° C.). In still other embodiments emulsions using a continuous phase of water and vinegar in an 8:1 ratio are mixed an emulsifier comprising heat moisture treated fava bean protein concentrates and an oil wherein said emulsifier and oil are mixed in a 1:40 ratio and the emulsion has a total oil load of about 30% and wherein said oil is soybean oil. In one more other embodiments said emulsion has a viscosity of between about 19,000 cps and about 22,500 cps after one week's storage at between 20 and 25° C.

In embodiments emulsions using heat moisture treated fava bean protein concentrates have a $d_{10}$ disperse phase droplet size (10% of droplets being smaller than) less than about 9 microns, or between about 7 and about 11 microns, or between about 8 and 10 microns, or about 9 microns. In embodiments emulsions using heat moisture treated fava bean protein concentrates have a $d_{50}$, or median, droplet size less than about 14 microns, or between about 12 and 16 microns, or between about 13 and about 15 microns, in or about 14 microns. In embodiments emulsions using heat moisture treated fava bean protein concentrates have a $d_{90}$ less than about 25 microns (90% of droplets being smaller than 25 microns), or between about 18 and about 24 microns, or between about 19 and about 23 microns, or about 22 microns. In embodiments emulsions made from heat moisture treated fava bean protein concentrates have $d_{90}$ of droplets 18 and about 24 microns, or between about 19 and about 23 microns, or about 22 microns after one week's storage at room temperature (between 20 and 25° C.) In embodiments, emulsions using heat moisture treated fava bean protein concentrates have a median droplet ($d_{50}$) size at least 10% smaller, or at least 15% smaller, or least 20% smaller, or between 10%-25%, or between 15-25% smaller than said emulsions using a heat moisture treated pulse flour, a non-fava bean heat moisture treated pulse concentrates a untreated pulse flour or pulse protein concentrate, and/or a pulse protein isolate. In embodiments emulsions made from heat moisture treated fava bean protein concentrates have a $d_{50}$ of droplets of less than about 17 microns, or less than about 15 microns, or between about 11 and about 14 microns. In still other embodiments emulsions using a continuous phase of water and vinegar in an 8:1 ratio are mixed an emulsifier comprising heat moisture treated fava bean protein concentrates and an oil wherein said emulsifier and oil are mixed in a 1:40 ratio and the emulsion has a total oil load of about 30% and wherein said oil is soybean oil. In one more embodiments said emulsions have a $d_{90}$ of droplets of less than 25 microns, and a $d_{50}$ of droplets of less than 15 microns.

In still other embodiments an emulsion made from heat moisture treated fava bean protein concentrates has improved interfacial elasticity compared to emulsions made using a heat moisture treated pulse flours, a non-fava bean heat moisture treated pulse concentrates, a untreated pulse flours and concentrates, and/or pulse protein isolates. Increased interfacial elasticity measures resistance to strain created by deformation. Without being bound by theory, an emulsion with higher interfacial elasticity is more stable as it is less likely to coalesce. In some embodiments this specification discloses an emulsion can be measured by tensiometer as follows:

Solutions were prepared by mixing the emulsifier with the buffer solutions (pH 3) which was prepared using sodium phosphate and citric acid) to make up 50 ml of the solutions with 0.1 w/v % concentration. The solutions were then mixed using automated magnetic stirrers at low-medium speed (~300-700 rpm) until the emulsifier was dissolved. After which, the solutions were filtered using 1.0 μm PTFE membrane (Puradisc 25 TF, Whatman). Tension and rheology measurements were taken of soybean oil (S7381, SigmaAldrich) droplets in the 0.1 w/v % (emulsifier/buffer) solutions (at pH 3) using the Profile Analysis Tensiometer (PAT-1M, Sinterface Technologies, Germany).

The set-up consists of a J-shape needle which is partially immersed in 25-30 ml emulsifier solution, the solution being contained in a glass cuvette. Soybean oil droplets of known volume (40 μL) are generated at the end of the needle. The shape of the oil droplet (or bubble in water) is recorded as a function of time and the interfacial tension is determined from the shape of the bubble using the Young-Laplace equation. After a preset time (3 h), droplet's tension reaches a quasi-equilibrium, and the droplet is set to oscillate at different frequencies. This is done through the injection and removal of a pre-set volume of the oil, as controlled by the software (SINTERFACE Profile Analysis Tensiometer PAT-1M VER.1.5.0.726).

In various embodiments an emulsion has an interfacial elasticity of greater than 20 mN/m, or greater than 21 mN/m, or between 20 mN/m and 30 mN/m, or between 21 mN/m and 25 mN/m, or between about 22 mN/m and 24 mN/m, and/or a heat moisture treated fava bean protein concentrate dispersed in a pH 3 aqueous solutions can from a soy oil emulsion having a dispersed phase particle having an interfacial elasticity of greater than 20 mN/m, or greater than 21 mN/m, or between 20 mN/m and 30 mN/m, or between 21 mN/m and 25 mN/m, or between about 22 mN/m and 24 mN/m. Still other embodiments an emulsion and/or a heat moisture treated fava bean protein concentrate dispersed in a pH 3 aqueous solutions can form a soy oil emulsion having a dispersed phase particle having an interfacial elasticity of greater than 20 mN/m, or greater than 21 mN/m, or between 20 mN/m and 30 mN/m, or between 21 mN/m and 25 mN/m, or between about 22 mN/m and 24 mN/m at 0.01 Hz, or 0.02 Hz, or 0.25 Hz, or 0.033 Hz, or 0.05 Hz, 0.21 Hz, or 0.2 Hz.

In various embodiments, emulsions using heat moisture treated fava bean protein concentrates and foodstuffs using said emulsions include, but are not limited to spoonable dressings, sauces, gravies, creamy soups, and creamy desserts. dairy and dairy like products for example, ice cream, whipped toppings (dairy and non-dairy), processed/imitation cheese, yogurt/sour cream dips, cheese dips, coffee whiteners, and include the non-dairy alternatives to all these items; bakery and bakery related items like, cakes, cookies, breads, muffins, cream fillings, fruit fillings, icings, doughnuts; candy and confectionary applications like chocolate, compounded chocolate, and chewing gum, savory applications margarines and spreads; and meat applications such as formed meats and emulsified meats.

In a further aspect this specification discloses a foodstuff using of a heat moisture treated fava bean protein concentrate, said foodstuff being a confectionary spread, for example a chocolate spread (within this specification confectionary spreads may apply to spreads having any flavor and are not limited to sweat spreads). In embodiments a confectionary spreads comprises a heat moisture treated fava bean protein concentrate and at least one additional ingredient. In other embodiments said confectionary is spreadable at ambient temperature (5° C. to 35° C.) where spreadability refers to the ease with which the foodstuff can be spread with a knife or similar utensil. Within this specification spreadability is characterized by functional and rheological properties of the said confectionary spread. In some embodiments spreadability of a confectionary spread is characterized by the peak stress required to spread the foodstuff, and the viscosity of the spread. Within this specification, a confectionary spread (or other foodstuff) is spreadable if it is characterized by a peak stress between 300 g and 450 g and a viscosity between 160 and 220 Pa·s. Other embodiments of confectionary spreads using heat moisture treated fava bean protein concentrates have a water activity of between 0.15 and 0.20. Within this specification, viscosity measurements are taken at 23° C. with a shear rate of 1 $s^{-1}$ and are measured on a controlled stress Rheometer (AR-G2, TA Instruments). In this specification, all peak stress measurements are made at 23° C. with a shear rate of 1 $s^{-1}$ by a controlled stress Rheometer (AR-G2, TA Instruments). Within this specification, water activity values are measured using an Aqua ab Dew Point Water Activity meter:water activity, being a ratio, is a unitless value.

In various embodiments confectionary spreads using heat moisture treated fava bean concentrates were more stability against oil separation than confectionary spreads made using heat moisture treated pulse flours, non-fava bean heat moisture treated pulse concentrates, untreated pulse flours and concentrates, and/or pulse protein isolates. In various embodiments stability against oil separation within a confectionary spread is measured by observation of pooled oil on the surface of the spread after a period of time. In various other embodiments confectionary spreads comprising a heat moisture treated fava bean protein concentrate had less microbial activity over time than confectionary spreads using a heat moisture treated pulse flours, a non-fava bean heat moisture treated pulse concentrates, a untreated pulse flours and concentrates, and/or pulse protein isolates. In still other embodiments a confectionary spread comprising heat moisture treated fava bean protein concentrate had a less beany flavor confectionary spreads made using a heat moisture treated pulse flour, a non-fava bean heat moisture treated pulse concentrate, a untreated pulse flours and concentrate, and/or pulse protein isolate.

In some other embodiments, a confectionary spread further comprised a non-hydrogenated plant oil having low solids content at ambient temperature (5° C. to 35° C.) and high stability. In one or more embodiments, said confectionary spread further comprised a plant oil having solid fat content of between about 0% and about 5%, or less than about 2.5%, or less than about 1%, or no more than 1% at 20° C. In further embodiments, a confectionary spread further comprises an oil having a solid fat content of between about 0% and about 20%, or less than about 17.5%, or less than about 15%, or less than about 13%, or no more than 13%, or between about 1% and 17.5%, or between about 5% and about 15% at 10° C. In still yet other embodiments, a confectionary spread further comprises an oil having a mean saturated fat content of between about 30% and about 50%, or between about 35% and about 45%, or between about 38% and about 42%, or about 40%. In yet even further embodiments a confectionary spread further comprises an oil having a mono-unsaturated fat content of between about 35% and about 55%, or between about 40% and about 50%, or between about 44% and about 48%, or about 46%. In yet even still other embodiments, a confectionary spread further comprises an oil having a poly-unsaturated fat content of between about 5% and about 20%, or between about 10% and about 15%, or about 12%. (All percentages in this paragraph are measured weight-by-weight of the oil as a whole.)

In some embodiments, confectionary spreads comprising a heat moisture treated fava bean protein concentrate further comprise a third ingredient being sucrose and/or a flavoring, such flavorings being provided by the following non-limiting examples: extracts, oils, purees, juice, juice concentrates, and powders such flavoring including the following non-limiting examples, fruit flavorings (e.g. strawberry, cherry, blueberry, peach, apricot, apple, banana, fig), nut flavorings (e.g. almond, hazelnut, pistachio, pecan), chocolate, coffee, and/or vanilla. In additional embodiments of said a confectionary spread a flavoring is added as a powder and is added in amounts of between 1% and 10%, between about 5% and about 10%, between about 7.5% and about 10%, or between about 8% and about 9% by weight of the spread. In yet other embodiments, the flavoring is a cocoa powder or a dark cocoa powder.

In some embodiments, a confectionary spread using a heat moisture treated fava bean protein concentrate comprises a second protein source. In at least one embodiment a confectionary spread comprising heat moisture treated fava bean protein concentrate and a second protein uses dairy component to supply the second protein, said dairy selected from milk (full fat, reduced fat, non-fat, and combinations thereof) and dairy solids (whey, casein, non-fat milk solids, and combinations thereof). In further embodiments, a dairy component may be added to a confectionary spread in a ratio (dairy component to heat moisture treated fava bean protein concentrate) of from about 3:1 to about 1:3, from about 2:1 to about 1:2, or 1:1 or about 1.6:1 to about 1.5:1, or about 1:1, or about 1.6:1.

In another embodiments, a confectionary spread comprising a heat moisture treated fava bean protein concentrate further comprises a sweetener, such as one of the following non-limiting examples: sucrose, allulose, a rebaudioside (e.g. rebaudioside M), fructooligosacharrides (e.g. nutraflora), and mixtures thereof.

In some embodiments, a confectionary spread using a heat moisture treated fava bean protein concentrate is a cocoa flavored. In other embodiments, this specification discloses a confectionary spread comprising cocoa powder, sucrose, palm oil, non-fat dry milk, heat moisture treated fava bean protein concentrate, and lecithin. In some embodiments, a confectionary spread comprising oil in an amount of between about 10% and about 30%, between about 15% and about 25%, between about 21.5% and about 23.5%, or between about 22% and about 23% by weight of the spread. In other embodiments, a confectionary spread comprises sweetener in an amount between about 25% and about 50%, between about 30% and about 40%, between about 35% and about 40%, or about 39% by weight of the spread. In yet other embodiments, a confectionary spread comprises a heat moisture treated fava bean protein concentrate in an amount between 10% and 40%, between 10% and 20%, between 15% and 20%, or about 17.5% by weight of the spread. In some embodiments, the lecithin contained in a confectionary spread described herein may come from any suitable source. In yet other embodiments, the lecithin is from soy. In still yet other embodiments, the lecithin is added to a confectionary spread in amounts between about 0.01% and about 1%, between about 0.1% and about 0.75%, between about 0.25% and about 0.5%, or about 0.4% by weight of the spread. In another embodiment, a confectionary spread comprises about 8.75% cocoa powder, about 39.01% sucrose, about 22.80% palm oil, and about 29.04% heat moisture treated fava bean concentrate. In still another embodiment, a confectionary spread comprises about 8.75% cocoa powder, about 39.01% sucrose, about 22.80% palm oil, about 11.21% non-fat dry milk, and about 17.83% heat moisture treated fava bean concentrate or heat moisture treated lentil flour. The percentages in this paragraph are weight percentages with reference to the weight of the spread.

In yet another embodiment, a confectionary spread using a heat moisture treated fava bean protein concentrate further comprises a second heat moisture treated pulse protein concentrate (for example a heat moisture treated lentil protein concentrate) said fava bean and lentil protein concentrates being mixed in a weight ratio of from 3:1 to 1:3, from 2:1 to 1:2, or 1:1.

In some embodiments, a confectionary spread described has a viscosity of between about 160 and about 220 Pa·s, between about 175 and about 210 Pa·s, between about 185 and about 205 Pa·s, or between about 190 and about 200 Pa·s.

In yet further embodiments a confectionary spread has a peak stress of between about 300 g to about 450 g, between about 300 g to about 320 g, between about 350 g and about 410 g, between about 380 and 405 g, or between about 390 and 402 grams.

In yet still other embodiments, a confectionary spread has a firmness of between about 1900 and about 2100 g, between about 1900 and about 1950 g, or between about 1920 and about 1940 g.

Variance in water activity is also a measure of stability as decreasing water activity indicates water loss from the spread; as water is lost, the spread becomes less spreadable. As shown below in Tables 3 and 4, variance in water activity is an important measure of the stability of the spread but is not sufficient, as spreads having varying ingredients, or usage level of ingredients may have consistent water activity over a six week period but still exhibit significant oil separation. Water activity is measured using an AquaLab Dew Point Water Activity meter. In some embodiments, a confectionary spread described herein will have a water activity of between about 0.10 and about 0.20, between about 0.12 and about 0.20, between 0.15 and 0.20, and between 0.14 and 0.16

In various embodiments a confectionary spread comprising a heat moisture treated fava bean protein concentrated has a maximum particle size (approximated by the particle diameter of sweetener within the spread) of less than about 125 microns, or less than about 120 microns, or less than about 115 microns, or less than about 110 microns, or less than about 105 microns. In other embodiments a confectionary spread comprising a heat moisture treated fava bean protein concentrate comprises a plurality of particles having a distribution of diameters, said distribution consists essentially of particles having diameters between about 0.1 μm and about 125 μm, or not more than 125 μm.

In other embodiments, confectionary spreads described herein that comprise a heat moisture treated fava bean protein concentrate have less oil separation over time than spreads made from untreated fava bean protein concentrates or heat moisture treated fava bean flours. In some embodiments, confectionary spreads described herein that comprise heat moisture treated fava bean protein concentrates showed no oil separation after four, five or six weeks.

In another aspect this specification disclose methods for making a confectionary spread comprising a heat moisture treated fava bean protein concentrate. In some embodiments, a confectionary spread is made by mixing an oil, a heat moisture treated fava bean protein concentrate, and optional a sweetener using conventional mixing equipment, such as, e.g. a stand mixer. In another embodiment, a confectionary spread is made by mixing an oil, a flavoring, a heat moisture treated fava bean protein concentrate, a sweetener, and a optionally dairy component using conventional mixing equipment, such as, e.g. a stand mixer. In further embodiments of the method for making a confectionary spread, an oil and at least a heat moisture treated fava bean protein concentrate are mixed together until combined. In still other embodiments of the method for making a confectionary spread, an oil and at least a heat moisture treated fava bean protein concentrate are mixed for between about 1 and about 20 minutes, or between about 1 and about 10 minutes, or about 5 minutes. In one more embodiments of the method for making a confectionary spread, sucrose (or other sweetener) and a flavoring powder are added to a mixture of an oil and heat moisture treated fava bean protein concentrate. In yet other embodiments of making a confectionary spread, a ingredients are mixed for between about 1 and about 20 minutes, or between about 1 and about 10 minutes, or about 5 minutes. In still other embodiments of the method for making a confectionary spread, the mixture of all ingredients is further refined in a manner to breaks down particles and/or polish the particles in a confectionary spread. In various embodiments of the method for making a confectionary spread, said refining is accomplished in one or more steps. In still other embodiments of the method for making a confectionary spread said refining steps include using roller refiner comprising one or more rollers. In yet still other embodiments of said method, a confectionary spread is fed on to a roller, or between a set of rollers. In yet still other embodiments of said method, said refining step may further include a conching step, which cooks the composition and/or agitates it to help disperse fat throughout the composition and/or may further polish the particles. In additional embodiments of the method of making a confectionary spread lecithin is added to said spread before conching. The still more embodiments of said method, said conching step is for less time and at lower temperature than is common for chocolate manufacturing. In at least one embodiment of said method, said conching step is between about 20 to about 40 minutes, or between about 25 and about 35 minutes, or for about 30 minutes. In at least one or more additional embodiments of said method, said conching step is at a temperature between about 40° and 50° C., or between about 42° and about 45° C., or about 43° C. (about 110° F.). In some embodiments a method for making a confectionary spread comprise refining said spread using a multiple roll, roller refiner, and refining said spread through said refiner multiple times. In at least one embodiment of a method for making a confectionary spread a roller refiner has between 1 and 5 rollers. In various other embodiments of a method for making a confectionary spread, said spread is refined between 20 and 40 times on a single roller refiner, or, on a three roller refiner, between 5 and 15 times, or between 7 and 12 times, or 9 times.

In another aspect this specification discloses a foodstuff being an ice cream comprising a heat moisture treated fava bean protein concentrate. In various embodiments a disclose ice cream is an ice cream. In various other embodiments a heat moisture treated fava bean protein concentrate is a used in an ice cream to replace monoglycerides and/or diglycerides. Yet still other embodiments are directed to an ice cream comprising heat moisture treated fava bean protein concentrated having an improved melt rate compared to an ice cream using no emulsifier. One more embodiments are directed to an ice cream comprising a mixture of milk (of any fat percentage) and/or cream (of any fat percentage) and/or nonfat milk solids, and/or a sweetener. One more other embodiments are directed to a method of making an ice cream comprising mixing all ingredients and homogenizing the mixture, and allowing the mixture to cool, and then further mixing the mixture at below freezing temperatures to incorporate sufficient air into the mixture.

Reference to 0% means below measurable limits and not is restricted to the absolute absence of the thing measured.

Within this specification reference to grams (g) as a measure of force means gram-force ($g_f$).

The following examples are provided as illustrations and should not be construed to limit the scope of the invention in any way. Persons of ordinary skill in the art will recognize that routine modifications may be made to the methods and materials used in the examples, which would still fall within the spirit and scope of the present invention.

EXAMPLE 1: EMULSION STABILITY

Procedural

Interfacial Tension and Interfacial Rheology Procedure:

50 ml solutions of emulsifier dispersed (0.1 w/v %) in buffer solutions (pH 3—sodium phosphate and citric acid) were made by mixing at low-medium speed (~300-700 rpm) to dissolve emulsifier. Solution was filtered using 1.0 μm PTFE membrane (Puradisc 25 TF, Whatman). Soybean oil was added to solution using a shape needle which is partially immersed emulsifier solution. Soybean oil droplets of known volume (40 μL) are generated at the end of the needle. The shape of the oil droplet (or bubble in water) is recorded as a function of time and the interfacial tension is determined from the shape of the bubble using the Young-Laplace equation. After a pre-set time (3 h), droplet's tension reaches quasi-equilibrium, and the droplet is set to oscillate at different frequencies. This is done through the injection and removal of a pre-set volume of the oil, as controlled by the software (SINTERFACE Profile Analysis Tensiometer PAT-1M VER.1.5.0.726; Sinterface Technologies, Germany).

Tensiometer measurements are reported in Table 2 and show that emulsions (40 μL soy bean oil in 0.1% w/v emulsifier/water solution) using heat-moisture treated fava bean concentrate emulsifier had increased surface elasticity than emulsifier solutions made using either untreated fava bean protein concentrate or pea protein isolate.

TABLE 1

Parameters

| No. | Period (s) | Frequency (Hz) | Number of oscillations | Amplitude, (%) |
|---|---|---|---|---|
| 1 | 100 | 0.010 | 4 | 10 |
| 2 | 50 | 0.020 | 5 | 10 |
| 3 | 40 | 0.025 | 5 | 10 |
| 4 | 30 | 0.033 | 8 | 10 |
| 5 | 20 | 0.050 | 10 | 10 |
| 6 | 10 | 0.100 | 10 | 10 |
| 7 | 5 | 0.200 | 10 | 10 |

The results are reported in Table 2.

TABLE 2

Tensiometer measurements

| Emulsifier | Interfacial Elasticity (mN/m) at defined pulsation frequency | | | | | | |
|---|---|---|---|---|---|---|---|
| | 0.01 Hz | 0.02 Hz | 0.025 Hz | 0.033 Hz | 0.05 Hz | 0.21 Hz | 0.2 Hz |
| untreated fava bean protein concentrate | 17.61 | 17.92 | 18.01 | 18.15 | 18.34 | 18.76 | N/A |
| HMT fava protein concentrate | 21.94 | 22.28 | 22.42 | 22.60 | 22.92 | 23.54 | 24.10 |
| Pea protein isolate | 17.32 | 17.71 | 17.86 | 18.08 | 18.39 | 19.05 | 19.31 |

EXAMPLE 2: EMULSIONS AS FOODSTUFFS

Procedural

Viscosity Measurement:

In the following examples Viscosity Measurements were made using a Brookfield DV2T with Heliopath (Brookfield AMETEK, of Middleboro, Mass.). Emulsion samples were measured using a T-Spindle C at 20 RPMs for 30 seconds.

Emulsion Particle Size Analysis:

The emulsion particle (droplet) size was measured using two methods. In Table 4, results were obtained using a laser diffractor using an Mie analysis model. In Tables 6 and 7, results were obtained using a FlowCam CS from Fluid Imaging Technologies, Inc., (Scarborough, Me.). Particles were measured at 20× magnification using 2-1000 μm filters with a greater than 0.95 aspect ratio and circle fit.

Emulsion Recipe:

Emulsions tested were made according to the table provided in Table 1, unless specified otherwise.

TABLE 3

Base emulsion recipe

| Ingredient | wt % |
|---|---|
| Water | 42.54 |
| CWS Starch | 4.50 |
| Vinegar (120 Grain) | 8.13 |
| Sugar | 11.51 |
| Mustard Powder | 0.23 |
| Paprika | 0.07 |
| Salt | 1.69 |
| EDTA | <~0.01 |
| Potassium Sorbate | 0.07 |
| Pulse protein | 0.75 |
| Soybean Oil | 30.50 |
| Total | 100.00 |

The pulse protein refers to treated or untreated pulse flour, treated or untreated pulse protein concentrate, pulse protein isolate, as specified. All samples were derived from fava bean.

Method for Making the Emulsion:

Unless otherwise specified emulsions were made blending all ingredients, and water and vinegar separately. All non-oil ingredients were KitchenAid stand mixer mixing bowl (KitchenAid Professional 5 Plus, KitchenAid, Benton Harbor, Mich.) until homogenized. Oil was slowly added while mixing at medium speed and the mass was transferred to a Scott Turbon mixer for high shear homogenization. (30 hertz for 2 minutes).

Storage Procedures:

Samples of the emulsion were stored at between 20 and 30° C. for the disclosed period of time.

EXAMPLE 2A: COMPARING HEAT MOISTURE TREATED FAVA BEAN CONCENTRATES WITH UNTREATED CONCENTRATES

Table 4 shows the viscosity and droplet size of emulsions made from heat moisture treated fava bean protein concentrates and untreated fava bean protein concentrates, and shows that, at equivalent usage, emulsions using heat moisture treated fava bean protein concentrated had higher viscosity and lower droplet size than emulsions made using untreated fava bean protein concentrate.

TABLE 4

HMT v. untreated fava bean protein concentrate emulsions

| Description | Viscosity (1 day) (cP) | Viscosity (1 wk) (cP) | Viscosity (1 mo) (cP) | Mean droplet size (1 mo) (μm) | Median droplet size (1 mo) (μm) |
|---|---|---|---|---|---|
| Untreated Fava bean Protein Concentrate | 17100 | 17500 | 18150 | 10.0 | 9.6 |
| HMT Fava bean Protein Concentrate | 21700 | 22500 | 22700 | 8.1 | 7.5 |

EXAMPLE 2B: COMPARING OIL LOADING, HEAT MOISTURE TREATED FAVA BEAN PROTEIN CONCENTRATES VERSUS UNTREATED CONCENTRATES

Table 5 provides the recipes used to study the effect of oil load on emulsions made using heat moisture treated fava bean protein concentrated compared to emulsions made using untreated fava bean protein concentrate.

TABLE 5

Oil load study recipes

| Ingredient | 0.5% Treated in 30% Oil | 1.0% Treated in 30% Oil | 0.5% Treated in 50% Oil | 1.0% Treated in 50% Oil | 0.5% Native in 30% Oil | 1.0% Treated in 30% Oil | 0.5% Treated in 50% Oil | 1.0% Treated in 50% Oil |
|---|---|---|---|---|---|---|---|---|
| Water | 49.8 | 49.3 | 31.8 | 31.3 | 49.8 | 49.3 | 31.8 | 31.3 |
| CWS Starch | 4.5 | 4.5 | 2.5 | 2.5 | 4.5 | 4.5 | 2.5 | 2.5 |
| Vinegar (120 Grain) | 8.13 | 8.13 | 8.13 | 8.13 | 8.13 | 8.13 | 8.13 | 8.13 |
| Sugar | 5 | 5 | 5 | 5 | 5 | 5 | 5 | 5 |
| Mustard Powder | 0.23 | 0.23 | 0.23 | 0.23 | 0.23 | 0.23 | 0.23 | 0.23 |
| Native fava bean protein concentrate | 0 | 0 | 0 | 0 | 0.5 | 1.0 | 0.5 | 1.0 |
| Treated fava bean protein concentrate | 0.5 | 1.0 | 0.5 | 1.0 | 0 | 0 | 0 | 0 |
| Paprika | 0.07 | 0.07 | 0.07 | 0.07 | 0.07 | 0.07 | 0.07 | 0.07 |
| Salt | 1.69 | 1.69 | 1.69 | 1.69 | 1.69 | 1.69 | 1.69 | 1.69 |
| EDTA | 0.01 | 0.01 | 0.01 | 0.01 | 0.01 | 0.01 | 0.01 | 0.01 |
| Potassium Sorbate | 0.07 | 0.07 | 0.07 | 0.07 | 0.07 | 0.07 | 0.07 | 0.07 |
| Soybean Oil | 30 | 30 | 50 | 50 | 30 | 30 | 50 | 50 |
| Total | 100% | 100% | 100% | 100% | 100% | 100% | 100% | 100% |

Table 6 shows that under all oil loads heat moisture treated fava bean protein concentrates had higher viscosity than emulsions made using untreated fava bean protein concentrate.

Namely, pea protein isolate emulsions were less opaque, had an amber color, and were flowable, whereas emulsions using heat moisture treated fava bean protein concentrates were off-white, and had a firm-set, spoonable texture.

TABLE 6

| Ingredient (Use Level %), | Oil Load % | Viscosity (1 day) (cP) | Viscosity (1 wk) (cP) | Viscosity (1 mo) (cP) |
|---|---|---|---|---|
| HMT Fava bean Protein Concentrate (0.5%) | 30 | 15250 | 16600 | 15250 |
| HMT Fava bean Protein Concentrate (1.0%) | 30 | 16550 | 17100 | 16250 |
| HMT Fava bean Protein Concentrate (0.5%) | 50 | 15750 | 16350 | 15900 |
| HMT Fava bean Protein Concentrate (1.0%) | 50 | 19400 | 20300 | 17000 |
| Untreated Fava bean Protein Concentrate (0.5%) | 30 | 14600 | 15150 | 15000 |
| Untreated Fava bean Protein Concentrate (1.0%) | 30 | 15050 | 15400 | 16450 |
| Untreated Fava bean Protein Concentrate (0.5%) | 50 | 14550 | 14700 | 15000 |
| Untreated Fava bean Protein Concentrate (1.0%) | 50 | 13550 | 13400 | 15100 |

EXAMPLE 2C: HEAT MOISTURE TREATED FAVA BEAN PROTEIN CONCENTRATE COMPARED TO PULSE PROTEIN ISOLATE

Using the recipe of Table 3, Table 7 reports the droplet size of emulsions using heat moisture treated fava bean protein concentrate and a commercially available pea protein isolate (Nutralys® S85 F (Roquette America Inc., Geneva Ill., measured to have 83% protein (dry weight basis)).

TABLE 7

HMT fava bean protein concentrate v. pea protein isolate emulsions

| Ingredient | Viscosity (cP) | Oil Droplet Mean (μm) | Oil Droplet $d_{10}$ (μm) | Oil Droplet $d_{50}$ (μm) | Oil Droplet $d_{90}$ (μm) |
|---|---|---|---|---|---|
| HMT Fava bean Protein Concentrate | 19150 | 10.80 | 9.27 | 13.83 | 24.47 |
| Pea protein isolate | 14500 | 11.88 | 10.31 | 16.72 | 29.09 |

Additionally, the pea protein isolate emulsion was observed to have worse sensory properties than the heat moisture treated fava bean protein concentrate emulsion.

EXAMPLE 2D: HEAT MOISTURE TREATED FAVA BEAN PROTEIN CONCENTRATE COMPARED TO UNTREATED AND HEAT MOISTURE TREATED FAVA BEAN PROTEIN FLOUR

TABLE 8

HMT fava bean protein concentrate v. HMT lentil protein concentrate recipe

| Ingredient | Weight % | | |
|---|---|---|---|
| Water | 30.98 | 30.96 | 30.97 |
| CWS Starch | 2.5 | 2.5 | 2.5 |
| Vinegar (120 Grain) | 6 | 6 | 6 |
| Sugar | 8 | 8 | 8 |
| Mustard Powder | 0.23 | 0.23 | 0.23 |
| Paprika | 0.07 | 0.07 | 0.07 |
| Salt | 1.69 | 1.69 | 1.69 |
| HMT Fava Bean Concentrate | 0.53 | | |
| Untreated Fava Bean Flour | | 0.55 | |
| HMT Lentil Flour | | | 0.54 |
| Soybean Oil | 50 | 50 | 50 |
| Total | 100% | 100% | 100% |

TABLE 9

HMT fava bean protein concentrate v.
HMT lentil protein concentrate recipe results

| Ingredient | 1 Week Oil Droplet $d_{10}$ (μm) | 1 Week Oil Droplet $d_{50}$ (μm) | 1 Week Oil Droplet $d_{90}$ (μm) |
|---|---|---|---|
| HMT Fava Protein Concentrate | 8.99 | 14.09 | 21.98 |
| Untreated Fava Bean Flour | 10.21 | 17.68 | 27.11 |
| HMT Lentil Flour | 14.55 | 24.36 | 32.71 |

EXAMPLE 3—CONFECTIONARY SPREADS

Procedural

Peak stress and Viscosity are measured using a controlled stress Rheometer (AR-G2, TA Instruments). Samples were loaded on a bottom Peltier plate set at 23° C. The top plate (50 mm, stainless) was lowered to measurement position with a gap of 1 mm. Then sample edge was trimmed and sealed using silicon oil to prevent evaporation. Rotational tests were performed at shear rate of 1 $s^{-1}$ for 120 sec.

The spread texture (work of shear and work of adhesion) was measured using a TAXT Plus Texture Analyzer with a spreadability attachment (Texture Technologies Corp.). Confectionary spread samples were filled into a receiving or base cone (i.e. the base plate having a conical void) with minimal physical structure disruption. Samples were displaced to within 2 mm of the base cone's surface using a corresponding conical probe attachment. Total work (area under force curve) during the compression process was calculated as Work of Shear, representing the work needed to spread the sample. Work of adhesion (area under force curve during withdrawal) describes the stickiness of the spread, which is measured as the probe is retracted from the spread, because the analyzer reports the work needed to pull the probe from the spread.

Certain solid ingredients may be dissolved or suspended with the spread. So particles size refers to measureable particles existing within the spread, and maximum particle size is approximated with the maximum particle size of the sweetener. To measure sweetener particle, microscopy images were taken to analyze sucrose particles. A small portion of spread sample was placed on a glass slide. A cover slide was put on top and pressed to smear sample to a thin layer. Microscopy images were taken under regular light. The size of sucrose particles were manually measured using point-to-point rule of INFINITY ANALYZE software.

Water activity was measured using an AquaLab Dew Point Water Activity meter.

Oil separation was measured by direct observation of the samples stored in sealed containers at ambient temperatures (5° C. to 35° C.) for six week. Observations were made each week. A sample was designated as having oil separation if oil was observed to have pooled on the surface of the spread.

EXAMPLE 3A CONFECTIONARY SPREAD RECIPES

TABLE 10

Spread analysis, base recipes

| Ingredients | Ex. 1 (wt %) | Ex. 2 (wt %) | Ex. 3 (wt %) | Ex. 4 (wt %) | Ex. 5 (wt %) |
|---|---|---|---|---|---|
| Dark cocoa powder | 8.75 | 8.75 | 8.75 | 8.75 | 8.75 |
| Fine Sucrose | 39.01 | 39.01 | 39.01 | 39.01 | 39.01 |
| Plant oil | 22.80 | 22.80 | 22.80 | 22.80 | 22.80 |
| NFDM | 11.21 | — | 11.21 | 29.04 | 11.21 |
| Untreated Fava Bean Protein Concentrate (min 60% protein in d.b.) | — | — | — | — | 17.83 |
| Treated Fava Bean Protein Concentrate (min 60% protein in d.b.) | 17.83 | 29.04 | — | — | — |
| Treated Lentil Flour (min 20% protein in d.b.) | — | — | 17.83 | — | — |
| Soy Lecithin | 0.40 | 0.41 | 0.40 | 0.40 | 0.40 |
| Total | 100.00 | 100 | 100.00 | 100.00 | 100.00 |

Ex. 1 is a partial replacement of milk with heat moisture treated fava bean protein concentrate. Ex. 2 fully replaces milk with heat moisture treated fava bean protein concentrate. Ex. 3 is a partial replacement of milk with heat moisture treated lentil flour. Ex. 4 is a full milk confectionary spread. Ex. 5 is a partial replacement of milk with untreated fava bean protein concentrate. In all recipes the oil was palm oil sold by Durkex®

The spreads were made by mixing the oil and the protein component in a Hobart® stand mixer, until combined. The cocoa powder and sucrose were then added to the mixture and were mixed until combined. The samples were refined for 9 times using a three roller refiner. Lecithin was then added to the refined samples, which were conched for 30 minutes at 110° F.

EXAMPLE 3B—CONFECTIONARY SPREAD ANALYSIS

TABLE 11

Rheology analysis

| Sample | Work of Shear (g · sec) | Peak Stress (Pa) | Viscosity at 1/s (Pa · s) |
|---|---|---|---|
| Ex. 1 (HMT fava concentrate and milk) | 1872 | 402 | 191 |
| Ex. 2 (HMT fava concentrate, no milk) | 1847 | 483 | 241 |
| Ex. 3 (HMT lentil flour and milk) | 1404 | 312 | 180 |
| Ex. 4 (Full milk, no pulse component) | 1129 | 221 | 144 |
| Ex. 5 (Untreated fava and milk) | 2384 | 468 | 238 |

TABLE 12

Effect of refining the spread and oil type

| Sample | Work of Shear (g · sec) | Peak Stress (Pa) | Viscosity at 1/s (Pa · s) |
|---|---|---|---|
| Ex. A: Fava bean protein concentrate and high solids palm oil* (unrefined) | 1607 | 533 | 187 |
| Ex. B: Fava bean protein concentrate and high solids palm oil (refined) | 2153 | 609 | 291 |

TABLE 12-continued

Effect of refining the spread and oil type

| Sample | Work of Shear (g · sec) | Peak Stress (Pa) | Viscosity at 1/s (Pa · s) |
|---|---|---|---|
| Ex. C: Fava bean protein concentrate and canola oil (refined) | 208 | 40 | 31 |

*SansTrans™ 39 shortening available from Loders Croklaan, Channahon, Ill. The high solids palm oil had the following profile: Solid fat content at 10° C. 48-54%; at 20° C. 24-30%; at 30° C. 7-13%; at 40° C. 5% max. (SansTrans™ 39 available from Loders Croklaan, Channahon, Ill.).

As shown, refining has a tendency to thicken the spread, and thickened the high oil solids content spreads above limits of spreadability. Also spreads made from canola oil were too thin, below the limits of spreadability. As seen, Ex. 2, the spread from untreated fava bean concentrate, and Ex. 5, the full milk replacement fava bean concentrate were harder, stickier and exhibited higher peak stress and viscosity than the other samples. The reported properties for Ex. 2 and Ex. 5 also exceeded those of standard commercial products. Showing that the spreads of Ex. 2 and Ex. 5 were less spreadable than other test or commercial products.

TABLE 13

Oil separation analysis

| Oil Separation | Week 1 | Week 2 | Week 3 | Week 4 | Week 5 | Week 6 |
|---|---|---|---|---|---|---|
| Ex. 1 (HMT fava concentrate and milk) | ND | ND | ND | ND | ND | Shinny surface but not oily |
| Ex. 2 (HMT fava concentrate, no milk) | ND | ND | ND | some | some | Some |
| Ex. 3 (HMT lentil flour and milk) | ND | ND | ND | some | some | Some |
| Ex. 4 (Full milk, no pulse component) | ND | ND | ND | ND | ND | Some |
| Ex. 5 (Untreated fava and milk | ND | ND | ND | some | some | Some |

Ex. 1 was observed to have a shinier surface after six weeks' than was previously observed, indicating minimal separation, but not enough separation for the oil to pool on the surface. As shown, no oil separation was detected (ND) in any example spread before four weeks' storages. At four weeks, oil separation was observed in Ex. 2, the full milk replacement spread, Ex. 3, using the treated lentil flour, and Ex. 5 using untreated fava has been concentrated. Notably the full milk spread remained stable for five week but exhibited separation at week six. Only the treated fava bean spreads had no oil pooling after six weeks. Illustrating their enhanced stability.

Despite differences in their functionality and rate of oil separation the tested samples had similar water activity.

TABLE 14

Water activity analysis

| Water activity | Week 1 | Week 2 | Week 3 | Week 4 | Week 5 | Week 6 |
|---|---|---|---|---|---|---|
| Ex. 1 (HMT fava concentrate and milk) | 0.16 | 0.19 | 0.15 | 0.15 | 0.20 | 0.16 |
| Ex. 2 (HMT fava concentrate, no milk) | 0.16 | 0.20 | 0.15 | 0.15 | 0.20 | 0.17 |
| Ex. 3 (HMT lentil flour and milk) | 0.16 | 0.22 | 0.15 | 0.17 | 0.20 | 0.18 |
| Ex. 4 (Full milk, no pulse component) | 0.16 | 0.22 | 0.16 | 0.15 | 0.36 | 0.18 |
| Ex. 5 (Untreated fava and milk | 0.15 | 0.21 | 0.11 | 0.14 | 0.20 | 0.18 |

EXAMPLE 4—ICE CREAM

Table Model ice creams used to measure the effect of heat moisture treated fava bean protein concentrates on melt rate.

TABLE 15

Ice cream recipes

| Ingredient | Positive Control (wt %) | Negative Control (wt %) | HMT Fava Bean Protein Concentrate |
|---|---|---|---|
| Skim Milk | 47.69 | 47.85 | 47.10 |
| NFDM | 5.00 | 5.00 | 5.00 |
| Heavy Cream | 27.00 | 27.00 | 27.00 |
| Sucrose | 12.00 | 12.00 | 12.00 |
| 36 DE Corn Syrup | 4.00 | 4.00 | 4.00 |
| 42 DE Corn Syrup | 4.00 | 4.00 | 4.00 |
| Mono- and Diglycerides | 0.16 | 0.00 | 0.00 |
| HMT Fava Bean Protein Concentrate | 0.00 | 0.00 | 0.75 |
| Stabilizer | 0.15 | 0.15 | 0.15 |

Ice cream was made using as follows: Pre-blends of dry ingredients were made prior to processing. On the day of processing, a portion of milk with all of the corn syrup was set aside and gently warmed on an induction burner until the corn syrup was fully-dissolved. The dry pre-blend was added to milk and corn syrup in a Likwifier and mixed for 20 minutes at approximately 500 rpm. The mixture was then transferred to a holding tank and the cream was gently mixed in. Pasteurization proceeded through the Microthermics HVHW HTST processing equipment by upstream homogenization. Target preheat: 150° F.; 1500/500 PSI homogenization pressure; 30 second hold; Final temperature: 185° F. Mix must be 175° F. minimum by end of hold tube. The mix was cooled and collected at 55-60° F. in small, sanitized containers. The mix was aged in refrigerated storage overnight. Aged mixed was removed from refrigerated storage and placed in the hold tanks of the WCB Technogel 100 continuous freezer. Mix was pushed through the freezer until clear of sanitizer, then the pump was turned off and the dasher and compressor turned on. Mix was allowed to freeze without pumping until a resistance of 10 amps was measured by the dasher. The pump was then turned on again, and air injection began at about 0.325 L/min. Mix was allowed to pump through the freezer until draw temperature measured 21-22° F.; backpressure was continuously monitored to maintain appx 6 PSI. Overrun measurements were made as air incorporation was adjusted; sample collection began only when overrun measures hit the target of 100% overrun.

$$\% \text{ Overrun} = \frac{\text{(wt of mix in volume} - \text{wt. of ice cream in same volume)}}{\text{wt of ice cream in same volume}}$$

Collected samples were allowed to harden in a −30° F. blast freezer for 4 hrs, and then moved to a −10° F. walk-in freezer for storage.

Melt rate was measured as follows: Weight of mix dripped through screen recorded every 5 minutes for 3 hours. The melt rate tests showed that ice creams using heat moisture treated fava bean protein concentrate had a melt rate closer to the melt rate of positive control (using monoglycerides and diglycerides) compared to the negative control (using no emulsifier).

What is claimed is:

1. A foodstuff comprising a heat moisture treated fava bean protein concentrate having between 50% and 73% protein, a denaturation enthalpy from 5.5 and 7.0 J/g, and a second edible ingredient.

2. The foodstuff of claim 1 wherein the heat moisture treated fava bean protein concentrate has a distribution of particles wherein a surface mean diameter of the particles is between about 5 and 20 microns, and a volume mean diameter of the particles is between about 20 and 100 microns.

3. The foodstuff of claim 1 wherein the heat moisture treated fava bean protein concentrate has a denaturation enthalpy is between 10% and 30% less than an untreated fava bean protein concentrate.

4. The foodstuff of claim 1 wherein the heat moisture treated fava bean protein concentrate has a distribution of particles wherein a surface mean diameter of the particles is at least 1.5 times the surface mean diameter of particles of an untreated fava bean protein concentrate.

5. The foodstuff of claim 1 wherein the heat moisture treated fava bean protein concentrate has a distribution of particles wherein a volume mean diameter at least 3 times the volume mean diameter of particles of an untreated fava protein concentrate.

6. The foodstuff of claim 1 wherein a heat moisture treated fava bean protein concentrate has a peak denaturation temperature of between 85 and 88.5° C.

7. The foodstuff of claim 1 wherein the heat moisture treated fava bean protein can be characterized by measuring the interfacial elasticity of a test emulsion wherein the test emulsion mixes 40 µL droplet of soy oil within 50 mL of a buffered solution comprising 0.1% w/v of the heat moisture treated fava bean protein concentrate having pH 3 and wherein the interfacial elasticity of the oil droplet is between 20 and 30 mN/m, as measured by the Interfacial tension and interfacial rheology procedure over a frequency range of between 0.01 and 0.2 Hz.

8. The foodstuff of claim 1 wherein the heat moisture treated fava bean protein concentrate can be characterized by the following test: a test emulsion having the recipe of Table 3 and mixed at 30 Hz for 2 minutes and stored at between 20° and 30° C. has a viscosity of between 19,000, and 22,500 cP after one week's storage.

9. The foodstuff of claim 1 comprising the heat moisture treated fava bean protein concentrate in an amount up to 50% of the composition.

10. The foodstuff of claim 1 comprising an emulsion.

11. The foodstuff of claim 1 being an oil-in-water emulsion which comprises:
  a) between about 15% to about 95% by weight of a continuous phase;
  b) between 1% to 75% by weight of a dispersed phase;
  c) between about 0.1% to 25% emulsifier;
  the emulsifier comprising at least 50% of the heat moisture treated fava bean protein.

12. The foodstuff of claim 1 being an oil-in-water emulsion which comprises:
  a) between about 15% to about 95% by weight of a continuous phase;
  b) between 1% to 75% by weight of a dispersed phase;
  c) between about 0.1% to 25% emulsifier
  wherein the emulsifier is the heat moisture treated fava bean protein concentrate and
  wherein the heat moisture treated fava bean protein concentrate is the sole emulsifier in the emulsion.

13. The foodstuff of claim 1 wherein the heat moisture treated fava bean protein concentrate is made in a process comprising adjusting the moisture content of an untreated fava bean protein concentrate to between about 10% and about 50% (dry solids basis) and heating the moisture adjusted untreated fava bean protein concentrate at a temperature between 100° and 180° C.

* * * * *